E. W. COMFORT.
THERMOSTAT.
APPLICATION FILED MAR. 30, 1905.
912,288.
Patented Feb. 16, 1909.
2 SHEETS—SHEET 1.
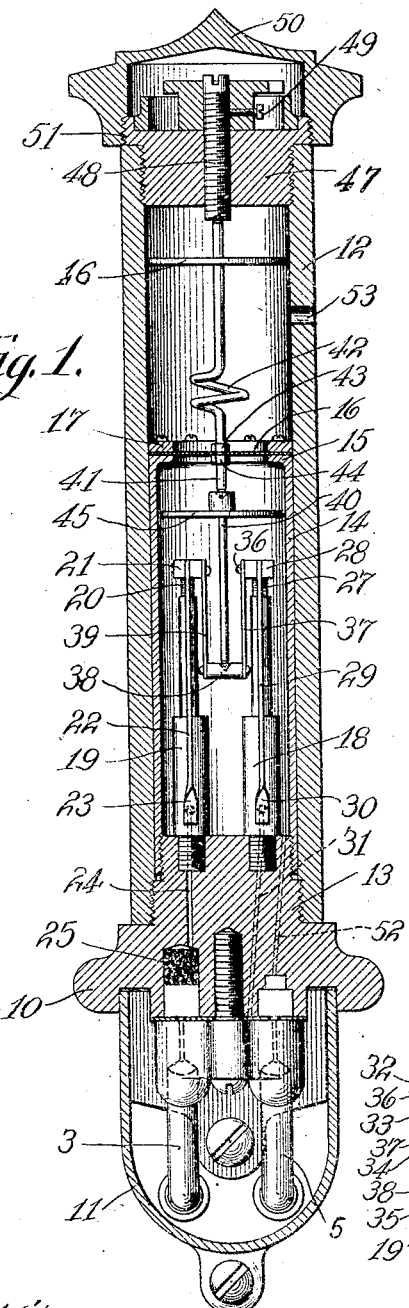
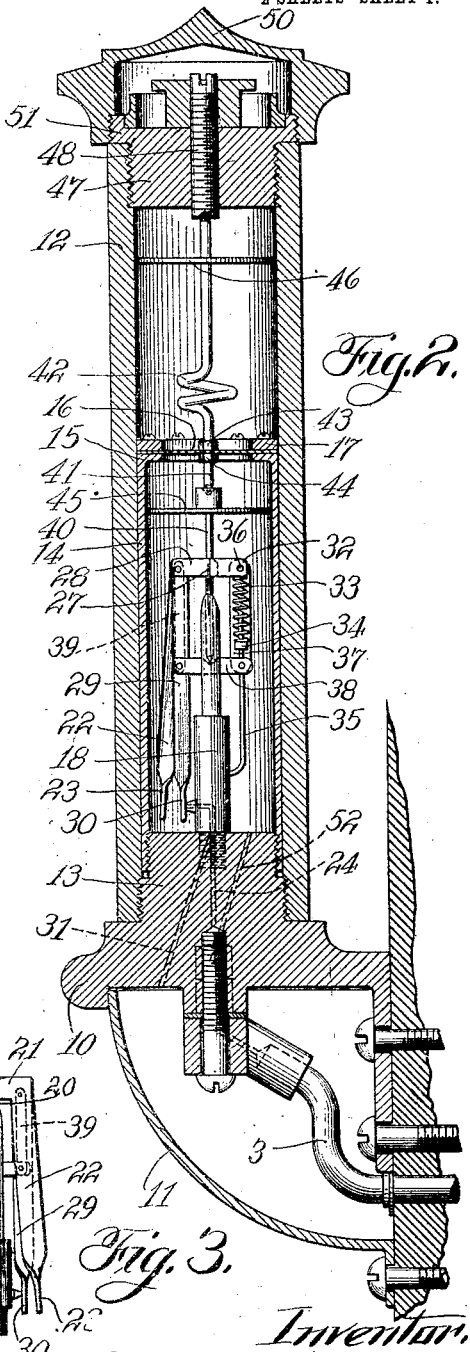
Witnesses:
Inventor:
Edward W. Comfort
By Jones, Addington + Ames
Attorneys.

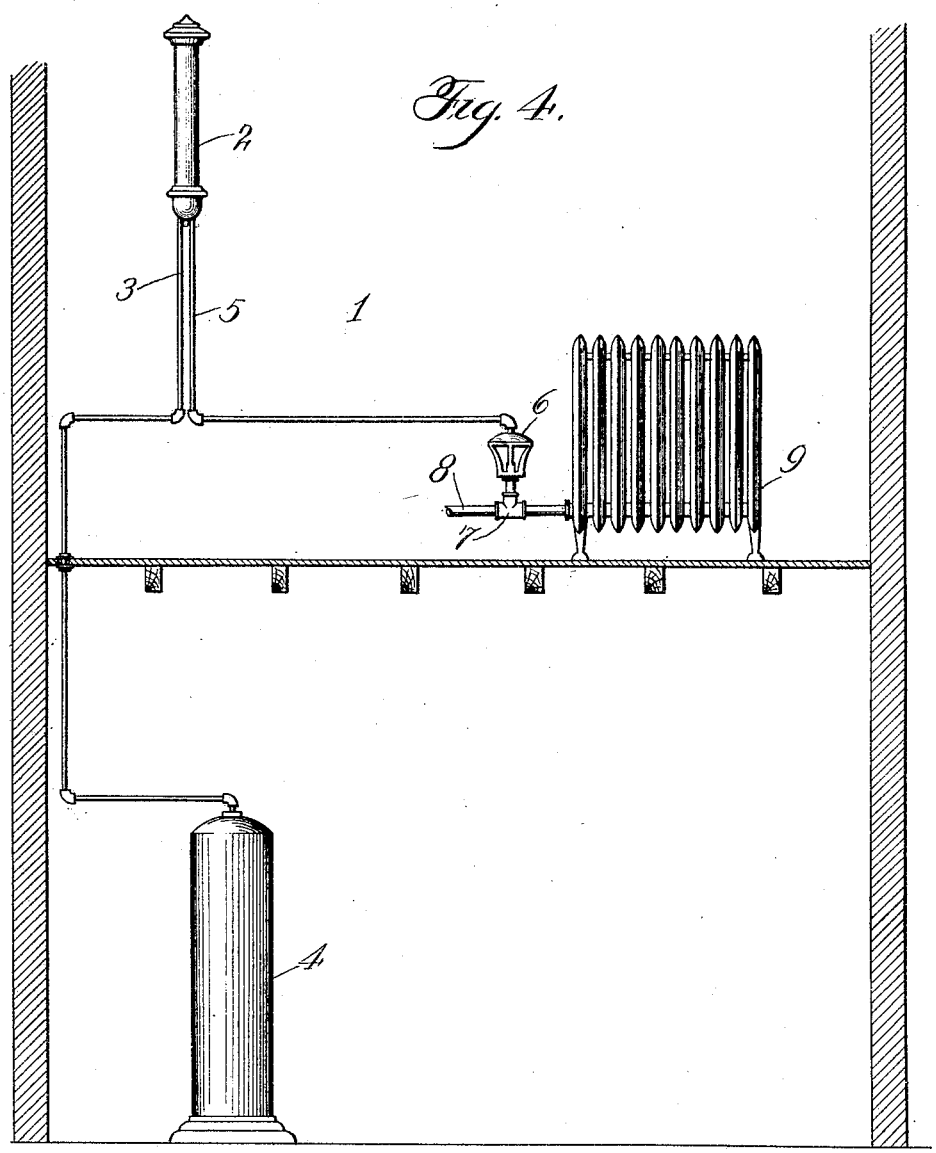

UNITED STATES PATENT OFFICE.

EDWARD W. COMFORT, OF CHICAGO, ILLINOIS, ASSIGNOR TO NATIONAL REGULATOR COMPANY, OF CHICAGO, ILLINOIS, A CORPORATION OF ILLINOIS.

THERMOSTAT.

No. 912,288.   Specification of Letters Patent.   Patented Feb. 16, 1909.

Application filed March 30, 1905. Serial No. 252,381.

*To all whom it may concern:*

Be it known that I, EDWARD W. COMFORT, a citizen of the United States, residing at Chicago, in the county of Cook and State of Illinois, have invented new and useful Improvements in Thermostats, of which the following is a full, clear, concise, and exact description, reference being had to the accompanying drawing, forming a part of this specification.

My invention relates to improvements in thermostatic devices designed to control the flow of fluid under pressure, so that a slight change of temperature will admit fluid against the piston or diaphragm of a motor and a corresponding reversed change of temperature will cause the fluid to escape from the motor. Such devices are particularly used in controlling the admission of steam to radiators in apartments and thereby operating to control the heat of the apartment, and my invention is particularly adapted for work of this character and is especially designed for controlling the admission of fluid under pressure to a motor controlling a steam valve in such a manner that the valve will be actuated positively. That is, when the valve has once started to open or close it must complete its movement before stopping or starting to move in a reverse direction. In thermostatic devices of this character, which have heretofore been constructed, the thermostatic element has been arranged to form a casing or chamber in which two valves are provided controlling inlet and outlet ports to said chamber or casing, said chamber or casing being connected by pipes with a source of fluid under pressure and with the motor to be controlled. Through mechanical connections between the thermostatic element and the valves, the valves have been adapted to be operated to open and close the ports under the slow and gradual change in the length of the thermostat, thereby controlling the admission to or escape of fluid from the motor and operating the same to open or close the steam valve. In these devices of the prior art, when the valve controlling the admission of fluid under pressure to the thermostat is open, the outlet valve is closed and the thermostat subjected to full pressure of the fluid furnishing power to operate the system. This pressure exerted upon the interior of the casing formed by the thermostat tends to produce an extension of the same. On the other hand, when the heat to which the thermostat is subjected decreases, to a predetermined degree, the thermostat will contract, closing the inlet port and opening the outlet port, permitting the escape of fluid under pressure which will relieve the pressure upon the interior of the casing and cause a further shortening of the thermostat, accelerating the movement of the thermostatic valve. Without this additional movement given to the thermostat by the change in pressure, if the outlet valve leaks slightly and the change in temperature is such as to just close the inlet valve and not sufficient to open the outlet valve, then the fluid pressure in the motor will gradually escape and permit the motor to partially open the steam valve, resulting in the accumulation of water in the radiator. However, by the provision of this additional movement given the thermostat by the change in pressure therein when the pressure in the thermostat decreases, the thermostat will shorten and operate to open the outlet valve independently of the change in temperature, thus insuring the full opening or the full closing of the steam valve. It will be seen, however, that this operation depends upon the stretch of the thermostat under pressure and as this pressure is frequently very low, the extent to which the thermostat may be stretched is small.

It is, therefore, one of the objects of my invention to provide means whereby a larger and more responsive movement of the valve may be given, corresponding to the variations of pressure and I am enabled to accomplish this by providing a casing which is independent of the thermostat and arranging a flexible diaphragm in the casing, which is connected with the thermostat by an elastic coupling. By varying the size of the diaphragm and the strength of the elastic connection, I am enabled to secure any desired amount of action independent of and auxiliary to the thermostatic action.

I have illustrated one manner of accomplishing the above mentioned object in the accompanying drawings, in which:

Figure 1 is a section taken through the thermostat and casing, but showing the valves and controlling mechanism in front elevation; Fig. 2 is a sectional view taken through the thermostat and casing, showing the valves and operating mechanism in side elevation; Fig. 3 is a detail view of the valve operating mechanism; and, Fig. 4 is a diagrammatic view showing the manner in which my thermostat is connected with the fluid pressure supply for operating the valve controlling the ordinary steam radiator.

Referring first to Fig. 4, in the room 1 whose temperature is to be controlled, is arranged my improved thermostat 2, which is connected by a pipe 3 with a tank 4 containing fluid under pressure and by another pipe 5 with a motor 6, which is adapted to open and close the valve 7 of the steam pipe 8, leading to the radiator 9. The valve 7 controls the supply of steam through the pipe 8 to the radiator 9 thereby controlling the heat of the room 1.

The motor 6 is preferably so constructed that when fluid under pressure is admitted thereto, it will operate to close the valve 7 and as the fluid pressure escapes therefrom the tendency will be to open the valve.

The particular construction of my preferred form of thermostat is illustrated in Figs. 1 to 3, inclusive, of the drawings. Upon the base 10, which is provided on its lower side with the hollow shield 11, is secured a thermostatic tube 12, preferably constructed of hard rubber, this tube being preferably at its lower end screw-threaded and screwed upon the projecting plug 13 of the base. The upper portion of the plug 13 above that portion to which the tube 12 is secured, is slightly reduced and mounted upon this reduced portion, by screwing the same thereon, is the cylindrical casing 14, in which the valve mechanism is adapted to be mounted. The upper end of this casing is provided with an inturned annular shoulder 15, upon which is mounted a flexible diaphragm 16, the diaphragm being held between the shoulder 15 and a ring or other securing means 17, fastened to the shoulder.

Projecting from the plug 13 of the base, are a pair of posts 18 and 19, and extending from the upper end of the post 19, is a flat spring 20, which forms a fulcrum for the cross-arm 21 of the valve arm 22. The lower end of the valve arm has formed thereon the valve 23, which when seated closes the port or passage 24, extending through the post 19 and base 10, and communicating with the pipe 3 leading from the fluid pressure supply. A filter 25 is provided in the base for preventing any small particles of dust contained in the fluid under pressure from entering through said port. The second post or support 18 extends from the plug 13 and this post is also provided at its upper end with a vertically arranged flat spring 27, which forms a fulcrum for the cross-arm 28 carrying a valve arm 29. The lower end of the valve arm carries a valve 30 which when seated closes a port or passage 31 extending through the post 18 and base 10 to the open air.

The cross-arm 28, has a rearwardly extending portion 32, between which and the nut 34 screwed upon the support 35 carried by the post 18 is arranged a coiled compression spring 33. Also connected to the rearwardly extending portion 32 of the cross-arm, by means of the inwardly projecting pin 36, is one end of a link 37, the lower end of which is connected with one end of a cross-yoke 38. The opposite end of this cross-yoke is connected by a link 39 with the upper end of the valve arm 22. An additional port or passage 52 is provided which connects the chamber within the casing 14 directly with the motor through the pipe 5.

In the upper face of the yoke 38, between its suspended extremities, is a conical depression, in which rests the conical lower end of a thrust-pin 40. The upper end of this thrust-pin 40 is enlarged and has formed therein a conical depression, into which is adapted to fit the lower end of the transmission rod 41, a portion of which is coiled, as at 42, to make a flexible connection between the diaphragm and the screw 48. Near its lower end, the transmission rod is adapted to pass through and be connected with the diaphragm 16, nuts 43 and 44 being screw-threaded upon the rod between which the diaphragm is adapted to be clamped. Secured upon the upper end of the thrust-pin is a circular disk 45, of sufficient size to fit within the casing 14 and keep the thrust-pin in a vertical position. A similar disk 46 is provided at the upper end of the transmission rod 41 to also maintain the transmission rod in a vertical position.

Within the upper end of the thermostatic tube 12 fits a screw-threaded plug 47, through which is adapted to be screwed an adjustable screw 48, having formed in its lower end a conical depression, in which is adapted to rest the conical upper end of the transmission rod 41. A nut having a suitable indicator thereon is mounted upon the upper end of the screw 48 and is secured thereto by a small set screw 49. By means of this nut the screw 48 may be rotated and the adjustment of the transmission rod 41 accomplished. After the screw 48 has been set it is preferably covered by a cap or casing 50, which is screwed upon a shoulder 51 of the plug 47.

In the operation of the thermostat, the tube or thermostatic element 12 will expand and contract under the rise and fall in temperature and in so doing, it will move the transmission rod 41 and the diaphragm 16. Any movement of the diaphragm will be transmitted through the thrust-pin 40, to the yoke 38, to operate the valves 23 and 30. Assuming, for the purpose of describing the operation more fully, that the valve 30 is closed and that the valve 23 is held open by the spring 20; under these conditions air is supplied to the motor and the steam valve 7 is closed. As the temperature in the room falls, the tube 12 will contract, exerting a downward pressure upon the transmission rod 41 and thrust-pin 40. The downward pressure of the thrust-pin will tend to close the inlet valve 23 and at the same time this pressure will tend to unseat the outlet valve 30, as the yoke is connected to the arm 32 upon the opposite side of its fulcrum. However, owing to the greater resistance offered by the spring 27, the resistance which has to be overcome in opening the outlet valve 30 is greater than that which has to be overcome in closing the inlet valve 23 and the outlet valve therefore will not be unseated as long as the valve arm 22 is free to move. As soon as the closing movement of the valve arm 22 is arrested by the seating of the inlet valve 23, any further downward pressure of the thrust-pin 40 will move the valve arm 29 and unseat the outlet valve 30. Unseating the valve 30 opens the port 31 and permits the air to escape from the motor to the atmosphere. This opens the valve 7 and admits steam to the radiator. When the temperature becomes too high, the expansion of the thermostat will permit the valve 30 to close and the valve 23 to open, admitting the fluid under pressure to the motor and closing the valve 7.

As the casing 14 is independent of the thermostat and the pressure therein does not affect the thermostat, it will be seen that as the inlet valve 23 is closed, cutting off the supply of fluid under pressure, and valve 30 opened, the pressure in the casing 14 will be decreased, reducing the pressure against the diaphragm 16 and the action of the thermostat in closing the valve 23 will be augmented or accelerated by the pressure of spring 42, opening the valve 30 more rapidly. Assuming that the outlet valve 30 is open and the inlet valve 23 closed, then as the thermostat expands and permits the valve 30 to close and valve 23 to open, the pressure coming through valve 23 will act on the diaphragm and force it up, accelerating the action of the thermostatic element.

In order that the air in the portion of the tube 12, situated above the diaphragm 16, may remain at atmospheric pressure an aperture 53, (Fig. 1) communicating with the atmosphere, is formed through the side of the tube 12.

Having thus described my invention what I claim as new and desire to secure by Letters Patent is:

1. The combination with a casing and two valves controlling the inlet and outlet thereof, of a thermostat independent of said casing, mechanical connections between said thermostat and said valves responsive to a gradual push or pull of said thermostat in either direction to positively close one of said valves before the opening of the other and means for accelerating the action of the thermostat.

2. The combination with a casing and two valves controlling the inlet and outlet thereof, of a thermostat independent of the casing, interdependent mechanical connections between said valves and said thermostat responsive to the action of said thermostat in either direction to positively close one valve and positively open the other, the opening of either valve being effected through its connections with the other and the thermostat so that its opening follows and depends upon the closing of the other without appreciable interval and means for accelerating the action of the thermostat.

3. The combination with a hollow thermostat, of an independent casing therein having a pressure chamber, an inlet and an outlet valve for said pressure chamber, valve operating mechanism within said casing, and mechanical connection between said thermostat and said valve operating mechanism for positively closing one of said valves before opening the other.

4. The combination with a casing and two valves controlling the inlet and outlet thereof, of a thermostat independent of said casing, reciprocating connections between said thermostat and said valves whereby a push or pull on the thermostat in contracting or expanding tends to open one valve and close the other, the time of opening of either valve being determined and dependent upon the closing of the other and means for accelerating the action of the thermostat.

5. The combination with a casing having a pressure chamber therein and provided with an inlet and an outlet valve, of a hollow thermostat independent of, and inclosing said casing, means affording connection between said thermostat and said valves for closing either of said valves before opening the other, and means for accelerating the action of the thermostat.

6. The combination of a casing having a pressure chamber, an outlet and an inlet valve for said chamber, a thermostat independent of, and inclosing, said casing, valve operating mechanism within said casing, and means affording mechanical connection between said thermostat and said valve operating mechanism for closing one of the said valves and thereafter opening the other of said valves.

7. The combination with a casing having an inlet port adapted to be connected with the supply, and an outlet port opening to the atmosphere, of a pipe leading from said casing to the motor, valves within said casing and controlling said inlet and outlet ports, a thermostat independent of said casing to operate said valves so as to close one before opening the other and means for accelerating the action of the thermostat.

8. The combination with a casing having a pressure chamber and provided with an inlet and an outlet port, of valves within said casing to open and close said ports, a thermostat independent of, and surrounding, said casing, and means affording mechanical connection between said thermostat and said valves, said means being arranged within said casing and adapted to close one of said valves before opening the other.

9. The combination with a casing, an outlet and inlet valve therefor, of a thermostat independent of said casing, connections between said thermostat and said valves for closing either of said valves before opening the other, and means for accelerating the action of the thermostat.

10. The combination with a casing having two valves controlling the inlet and outlet thereof, of a thermostat for operating said valves and a diaphragm operatively connected with said valves and adapted to assist said thermostat in its action upon said valves.

11. The combination with a hollow thermostat, of a casing within the thermostat having an inlet port adapted to be connected with a source of fluid supply and an outlet port opening to the atmosphere, a connection from said casing to the motor or equivalent device, a valve for each of said ports, said valves being operated by said thermostat to admit fluid under pressure to or exhaust the same from the motor in response to temperature changes, and valve controlling mechanism to cause the open valve to close before the closed valve opens.

12. The combination with a hollow tube forming a thermostat, of a casing fitting within the tube but independent thereof, said casing having an inlet port adapted to be connected with a source of fluid supply and an outlet port opening to the atmosphere, a connection from said casing to the motor, a valve for each of said ports, said valves being operated by said thermostat to admit fluid under pressure to and exhaust same from the motor, and valve controlling mechanism within the casing to cause one valve to close before the other opens.

13. The combination with a casing having an inlet port adapted to be connected with a source of fluid under pressure and an outlet port opening to the atmosphere, of a connection from said casing to the motor, a valve for each of said ports, a thermostat independent of said casing to operate said valves in response to temperature changes to admit fluid under pressure to and to exhaust same from the motor, valve controlling mechanism to cause the open valve to close before the other valve opens, and means responsive to variations of pressure for accelerating the movement of the valves.

14. The combination with a casing having an inlet port connected with a source of fluid under pressure and an outlet port opening to the atmosphere, of a connection from said casing to the motor, a valve for each of said inlet and outlet ports, a thermostat independent of said casing and for causing said valves to operate to admit fluid under pressure and to exhaust the same from the motor, a controlling mechanism for operating said valves, said casing having a portion of the wall thereof flexible and adapted to respond to the pressure within the casing, and a connection between said flexible wall and said valve controlling mechanism and between said flexible wall and said thermostat.

15. The combination with a hollow thermostat, of a casing within the thermostat having a flexible wall, said casing having an inlet port adapted to be connected with a source of fluid supply and an outlet port opening to the atmosphere, a connection from said casing to the motor, a valve for each of said ports, valve operating and controlling mechanism connected between the thermostat and the valves through the medium of said flexible wall, said operating mechanism serving to operate said valves in response to temperature changes to admit fluid under pressure to and exhaust same from the motor, and said flexible wall being responsive to the variations of pressure within the casing.

16. The combination with a thermostatic tube, of a casing fitting within one end of the thermostatic tube but independent thereof, an inlet port and outlet port for said casing, valves for said ports, a flexible diaphragm forming the inner end wall of said casing, a mechanical connection between said diaphragm and the opposite end of the thermostat, controlling mechanism between the inner side of said diaphragm and the valves located within the casing, said connection and mechanism serving to open and close said valves in response to temperature changes and to cause the closing of one valve before the other opens, the said diaphragm being responsive to the changes of pressure within the casing.

In witness whereof, I have hereunto subscribed my name in the presence of two witnesses.

EDWARD W. COMFORT.

Witnesses:
W. PERRY HALM,
M. R. ROCHFORD.